United States Patent
Whelan

(10) Patent No.: US 10,461,868 B2
(45) Date of Patent: Oct. 29, 2019

(54) SYSTEMS AND METHODS FOR REDUCING UNDESIRABLE BEHAVIORS IN RF COMMUNICATIONS

(71) Applicant: CalAmp Wireless Networks Corporation, Irvine, CA (US)

(72) Inventor: Yvonne Whelan, Irvine, CA (US)

(73) Assignee: CalAmp Wireless Networks Corporation, Irvine, CA (US)

(*) Notice: Subject to any disclaimer, the term of this patent is extended or adjusted under 35 U.S.C. 154(b) by 0 days.

(21) Appl. No.: 15/683,022

(22) Filed: Aug. 22, 2017

(65) Prior Publication Data

US 2019/0013880 A1   Jan. 10, 2019

Related U.S. Application Data

(60) Provisional application No. 62/528,898, filed on Jul. 5, 2017.

(51) Int. Cl.
| | |
|---|---|
| H04B 1/38 | (2015.01) |
| H04B 15/00 | (2006.01) |
| H04B 1/40 | (2015.01) |
| H04B 17/18 | (2015.01) |
| H04B 1/04 | (2006.01) |

(52) U.S. Cl.
CPC .............. *H04B 15/00* (2013.01); *H04B 1/04* (2013.01); *H04B 1/40* (2013.01); *H04B 17/18* (2015.01)

(58) Field of Classification Search
CPC ........... H04B 15/00; H04B 17/18; H04B 1/40
USPC ...... 455/73; 340/989, 825.49, 438; 370/336; 701/2; 705/35
See application file for complete search history.

(56) References Cited

U.S. PATENT DOCUMENTS

| | | |
|---|---|---|
| 4,177,466 A | 12/1979 | Reagan |
| 4,818,988 A | 4/1989 | Cooperman et al. |
| 4,818,998 A | 4/1989 | Apsell et al. |
| 4,908,609 A | 3/1990 | Stroomer |
| 5,032,845 A | 7/1991 | Velasco |

(Continued)

FOREIGN PATENT DOCUMENTS

| | | |
|---|---|---|
| EP | 1885058 A1 | 2/2008 |
| WO | 1991012671 | 8/1991 |
| WO | 2011049619 A1 | 4/2011 |

OTHER PUBLICATIONS

Written Opinion of the International Searching Authority for PCT Application No. PCT/US10/02789 dated Dec. 29, 2010 (6 pages).

*Primary Examiner* — Edward F Urban
*Assistant Examiner* — Max Mathew
(74) *Attorney, Agent, or Firm* — KPPB LLP

(57) ABSTRACT

Systems and methods for reducing undesirable behaviors in RF communications in accordance with embodiments of the invention are disclosed. In one embodiment, a vehicle telematics device includes a processor, a transceiver, an amplifier, and a memory connected to the processor and storing a transmission control application, wherein the transceiver is connected to the amplifier, the amplifier is connected to the processor, and the transmission control application directs the processor to format data to be transmitted by the transceiver, determine a leading bit-edge of the transceiver signal, direct the amplifier to sequentially amplify the transceiver signal, transmit data, and direct the amplifier to sequentially de-amplify the transceiver signal.

16 Claims, 5 Drawing Sheets

(56) References Cited

U.S. PATENT DOCUMENTS

| | | | |
|---|---|---|---|
| 5,109,538 A | 4/1992 | Ikonen et al. |
| 5,343,498 A | 8/1994 | Toy et al. |
| 5,392,287 A | 2/1995 | Tiedemann, Jr. et al. |
| 5,438,684 A | 8/1995 | Osamni et al. |
| 5,526,357 A | 6/1996 | Jandress |
| 5,704,008 A | 12/1997 | Duvall, Jr. |
| 5,732,339 A | 3/1998 | Auvray et al. |
| 5,789,098 A | 8/1998 | Pinder |
| 5,917,423 A | 6/1999 | Duvall |
| 5,939,941 A | 8/1999 | Nair et al. |
| 5,940,431 A | 8/1999 | Haartsen et al. |
| 6,058,289 A | 5/2000 | Gardner et al. |
| 6,198,919 B1 | 3/2001 | Buytaert et al. |
| 6,229,988 B1 | 5/2001 | Stapefeld et al. |
| 6,289,227 B1 | 9/2001 | Shi |
| 6,317,049 B1 | 11/2001 | Toubia et al. |
| 6,363,102 B1 | 3/2002 | Ling et al. |
| 6,522,698 B1 | 2/2003 | Irving et al. |
| 6,535,116 B1 | 3/2003 | Zhou |
| 6,564,074 B2 | 5/2003 | Romans |
| 6,603,335 B1 | 8/2003 | Macphail et al. |
| 6,647,270 B1 | 11/2003 | Himmelstein |
| 6,665,613 B2 | 12/2003 | Duvall |
| 6,774,845 B2 | 8/2004 | De |
| 6,799,030 B2 | 9/2004 | Barber |
| 6,888,495 B2 | 5/2005 | Flick |
| 6,978,149 B1 | 12/2005 | Morelli et al. |
| 7,030,731 B2 | 4/2006 | Lastinger |
| 7,034,656 B2 | 4/2006 | Buchner |
| 7,149,484 B2 * | 12/2006 | Nation ............. H04M 1/60 455/126 |
| 7,149,623 B2 | 12/2006 | Flick et al. |
| 7,269,145 B2 | 9/2007 | Koo |
| 7,378,964 B1 | 5/2008 | Amir et al. |
| 7,511,606 B2 | 3/2009 | Romano et al. |
| 7,525,289 B2 | 4/2009 | Janik et al. |
| 7,573,381 B2 | 8/2009 | Karr et al. |
| 7,574,192 B2 | 8/2009 | Gudmundsson |
| 7,592,918 B2 | 9/2009 | Karr |
| 7,593,711 B2 | 9/2009 | Romano et al. |
| 7,598,855 B2 | 10/2009 | Scalisi et al. |
| 7,733,187 B2 | 6/2010 | Tateoka et al. |
| 7,768,234 B2 | 8/2010 | Janik et al. |
| 7,853,218 B2 | 12/2010 | Romano et al. |
| 8,013,735 B2 | 9/2011 | Arpin et al. |
| 8,036,152 B2 | 10/2011 | Hirt et al. |
| 8,099,062 B1 | 1/2012 | Terrovitis et al. |
| 8,126,036 B2 * | 2/2012 | Koren ............. H04L 27/367 370/276 |
| 8,150,686 B2 | 4/2012 | Pietsch et al. |
| 8,223,783 B2 | 7/2012 | Shorty |
| 8,229,518 B2 | 7/2012 | Bourque |
| 8,489,271 B2 | 7/2013 | Hergesheimer et al. |
| 8,618,957 B2 | 12/2013 | Meacci et al. |
| 8,630,605 B2 | 1/2014 | Meacci et al. |
| 8,787,823 B2 | 7/2014 | Justice |
| 9,088,398 B2 | 7/2015 | Rhodes et al. |
| 9,112,674 B2 | 8/2015 | Meacci et al. |
| 9,480,037 B2 | 10/2016 | Meacci et al. |
| 9,565,636 B2 | 2/2017 | Meacci et al. |
| 10,243,766 B2 | 3/2019 | Whelan |
| 2002/0019215 A1 | 2/2002 | Romans |
| 2003/0030568 A1 | 2/2003 | Lastinger et al. |
| 2003/0067672 A1 | 4/2003 | Bodeep et al. |
| 2003/0112124 A1 | 6/2003 | Gudmundsson |
| 2003/0117969 A1 | 6/2003 | Koo et al. |
| 2003/0154027 A1 | 8/2003 | Flick et al. |
| 2003/0218500 A1 | 11/2003 | Yamamoto et al. |
| 2004/0017859 A1 | 1/2004 | Sills et al. |
| 2004/0039504 A1 | 2/2004 | Coffee et al. |
| 2004/0075494 A1 | 4/2004 | Klomsdorf et al. |
| 2004/0104771 A1 | 6/2004 | Dauphinee et al. |
| 2004/0105033 A1 | 6/2004 | Dauphinee et al. |
| 2004/0130488 A1 | 7/2004 | Champlain |
| 2004/0201520 A1 | 10/2004 | Flick et al. |
| 2004/0207468 A1 | 10/2004 | Klomsdorf et al. |
| 2004/0207510 A1 | 10/2004 | Buchner |
| 2005/0130617 A1 | 6/2005 | Burns et al. |
| 2005/0208910 A1 | 9/2005 | Burns et al. |
| 2005/0233764 A1 | 10/2005 | Solski et al. |
| 2005/0258806 A1 | 11/2005 | Janik et al. |
| 2006/0067435 A1 | 3/2006 | Ogawa et al. |
| 2006/0194549 A1 | 8/2006 | Janik et al. |
| 2006/0255935 A1 | 11/2006 | Scalisi et al. |
| 2006/0276160 A1 | 12/2006 | Romano et al. |
| 2007/0008108 A1 | 1/2007 | Schurig et al. |
| 2007/0103271 A1 | 5/2007 | King |
| 2007/0194924 A1 | 8/2007 | Karr |
| 2007/0207750 A1 | 9/2007 | Brown et al. |
| 2007/0281626 A1 * | 12/2007 | Dobosz ............. H04B 1/0007 455/73 |
| 2008/0144539 A1 | 6/2008 | Sperlich et al. |
| 2008/0164940 A1 | 7/2008 | Jeon et al. |
| 2008/0180178 A1 | 7/2008 | Gao et al. |
| 2008/0240311 A1 | 10/2008 | Piirainen et al. |
| 2009/0309656 A1 | 12/2009 | Jeon et al. |
| 2010/0179897 A1 * | 7/2010 | Gafford ............. G06Q 10/087 705/35 |
| 2010/0240302 A1 | 9/2010 | Buczkiewicz |
| 2011/0095915 A1 | 4/2011 | Justice et al. |
| 2011/0098015 A1 | 4/2011 | Goodwin et al. |
| 2012/0120990 A1 * | 5/2012 | Koren ............. H04B 1/0475 375/219 |
| 2014/0010210 A1 * | 1/2014 | Rhodes ............. G01S 5/0018 370/336 |
| 2014/0105089 A1 | 4/2014 | Meacci et al. |
| 2014/0105341 A1 | 4/2014 | Meacci et al. |
| 2014/0119567 A1 | 5/2014 | DeLine et al. |
| 2015/0015424 A1 * | 1/2015 | Justice ............. B60R 25/102 340/989 |
| 2016/0073369 A1 | 3/2016 | Meacci et al. |
| 2016/0087658 A1 | 3/2016 | Weissman et al. |
| 2016/0209818 A1 * | 7/2016 | Mandle ............. G05B 15/02 |
| 2016/0214572 A1 * | 7/2016 | Snider ............. B60R 25/241 |
| 2016/0241699 A1 * | 8/2016 | Milnark ............. H04M 1/72527 |
| 2017/0127353 A1 | 5/2017 | Meacci et al. |
| 2018/0138878 A1 * | 5/2018 | Domino ............. H03G 1/0088 |
| 2019/0013783 A1 | 1/2019 | Fedan |
| 2019/0013976 A1 | 1/2019 | Whelan |

* cited by examiner

SYSTEMS AND METHODS FOR REDUCING UNDESIRABLE BEHAVIORS IN RF COMMUNICATIONS

CROSS REFERENCE TO RELATED APPLICATIONS

The instant application claims priority to U.S. Provisional Patent Application No. 62/528,898, filed Jul. 5, 2017, the disclosure of which is hereby incorporated by reference in its entirety.

FIELD OF THE INVENTION

The present invention relates to radio frequency transmissions and more specifically to operating transceivers to transmit radio frequency signals.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, vehicle location determination, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for reducing undesirable behaviors in RF communications in accordance with embodiments of the invention are disclosed. In one embodiment, a vehicle telematics device includes a processor, a transceiver, an amplifier, and a memory connected to the processor and storing a transmission control application, wherein the transceiver is connected to the amplifier, the amplifier is connected to the processor, and the transmission control application directs the processor to format data to be transmitted by the transceiver, determine a leading bit-edge of the transceiver signal, direct the amplifier to sequentially amplify the transceiver signal, transmit data, and direct the amplifier to sequentially de-amplify the transceiver signal.

In another embodiment of the invention, the formatting of the data includes prepending a buffer signal before data modulation begins.

In an additional embodiment of the invention, the leading bit-edge is determined by monitoring an output signal of the low-power transceiver.

In yet another additional embodiment of the invention, the monitoring of the output signal of the low-power transceiver is occurs after the submission of a signal to be transmitted.

In still another additional embodiment of the invention, the transmission control application further directs the processor to monitor the conditions of the low-power transceiver before formatting data.

In yet still another additional embodiment of the invention, the transmission control application further directs the processor to adjust the sequential amplification and de-amplification of the low-power transceiver based upon the monitored conditions of the low-power transceiver.

In yet another embodiment of the invention, the sequential amplification of the low-power transceiver is completed faster than the sequential de-amplification of the low-power transceiver.

In still another embodiment of the invention, the sequential amplification and de-amplification of the low-power transceiver are non-linear.

In yet still another embodiment of the invention, the sequential amplification and de-amplification of the low-power transceiver are achieved through a pulse wave modulated (PWM) signal applied as a control signal to the amplifier.

In yet another additional embodiment of the invention, the amplified low-power transceiver signal is approximately 2 Watts.

Still another embodiment of the invention includes a method for reducing undesirable behaviors in RF communications including formatting data to be transmitted using a vehicle telematics device comprising a processor and a memory, determining a leading bit-edge of the low-power transceiver signal using the vehicle telematics device, directing an amplifier to sequentially amplify the low-power transceiver signal using the vehicle telematics device, transmitting the data using the vehicle telematics device, and directing the amplifier to sequentially de-amplify the low-power transceiver signal using the vehicle telematics device.

In yet another additional embodiment of the invention, the formatting of the data includes prepending a buffer signal before data modulation begins.

In still another additional embodiment of the invention, the leading bit-edge is determined by monitoring an output signal of the low-power transceiver.

In yet still another additional embodiment of the invention, the monitoring of the output signal of the low-power transceiver is occurs after the submission of a signal to be transmitted.

In yet another embodiment of the invention, the method further includes monitoring the conditions of the low-power transceiver prior to formatting data.

In still another embodiment of the invention, the method further includes adjusting the sequential amplification and de-amplification of the low-power transceiver based on the monitored conditions of the low-power transceiver.

In yet still another embodiment of the invention, the sequential amplification of the low-power transceiver is completed faster than the sequential de-amplification of the low-power transceiver.

In yet another additional embodiment of the invention, the sequential amplification and de-amplification of the low-power transceiver are non-linear.

In still another additional embodiment of the invention, the sequential amplification and de-amplification of the low-power transceiver are achieved through a pulse wave modulated (PWM) signal applied as a control signal to the amplifier.

In yet still another additional embodiment of the invention, the amplified low-power transceiver signal is approximately 2 Watts.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the prepended claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Figure 1A:
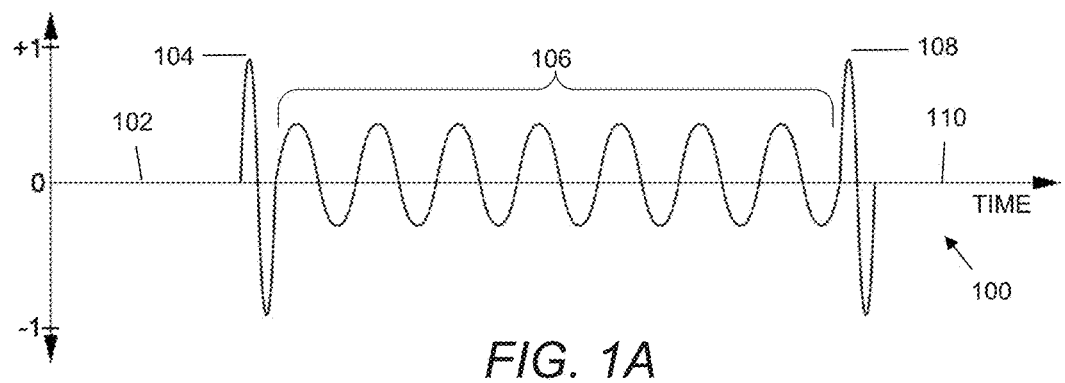
FIG. 1A is a graph conceptually illustrating the power output of a low-power transceiver over time in accordance with an embodiment of the invention.

Turning now to the drawings, systems and methods for reducing undesirable behaviors in RF communications in accordance with embodiments of the invention are disclosed. Many vehicles are equipped with a vehicle telematics device. These vehicle telematics devices can obtain and/or measure a variety of data regarding the conditions and/or location of the vehicle along with receiving and transmitting data to remote server systems. In order to facilitate these communications, the vehicle telematics device can include components such as a low-power transceiver, amplifier, and processor. In many applications, it may be desirable to utilize a lower-cost, low-power transceiver and amplify its signal to increase the range of transmission instead of using a traditional, higher-powered transceiver. Additionally, reducing the amount of spurious emissions can yield a greater level of energy efficiency, which may be critical for certain applications including situations in which a vehicle telematics device relies solely on battery power. However, utilizing low-power transceivers can introduce numerous undesirable behaviors. These behaviors may include, but are not limited to, increased spikes in output transmission power, disorderly ramping of transmission power, or other spurious emissions. While such undesirable behaviors may be acceptable for usage in low-power applications, amplifying the transceiver signal may exacerbate these problems in such a way that they may be unacceptable for regulatory testing compliance and decrease the energy efficiency of the device, thereby reducing the lifespan of the vehicle telematics device.

Vehicle telematics devices in accordance with embodiments of the invention overcome these limitations by controlling the time of commands sent to the low-power transceiver and/or amplifier in a manner that minimizes undesirable behaviors in the vehicle telematics device, thereby anticipating the operational characteristics of the low-power transceiver and correcting for its undesirable behaviors. In a number of embodiments, the processor sends commands to the low-power transceiver and/or amplifier at specific time intervals that allow for a reduction in spurious transmission in the amplified transmissions. Commands sent to the low-power transceiver and/or amplifier may include, but are not limited to, commands to power up or power down the appropriate device and/or circuitry. In several embodiments, the operational characteristics (i.e. the timing of a power-up or power-down) of the low-power transceiver are not directly controlled by the commands and the operation of the amplifier is dynamically adjusted based on the operational characteristics of the low-power transceiver. In this way, spectral regrowth can be limited and/or controlled. In further embodiments, the amplifier may be controlled in a manner that allows for separately timed powering up and powering down of the low-power transceiver and/or amplifier. Such control may be achieved through a combination of hardware or software in accordance with applications of embodiments of the invention. In still further embodiments, the low-power transceiver and/or amplifier is powered up faster than it is powered down, reducing the emission of spurious emissions. In many embodiments, profile data can be generated and/or utilized to describe the operational characteristics of the low-power transceiver and/or to describe the appropriate timings to power up and down the low-power transceiver and/or amplifier. By dynamically switching between different profiles, non-linear control of the low-power transceiver can be achieved in accordance with a number of embodiments of the invention.

In a variety of embodiments, the operational state of a vehicle is utilized to determine if a vehicle telematics device should transmit and/or receive data. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD-II or other vehicle data bus line, and/or vehicle position information. In many embodiments, multiple different types of information are combined to ascertain the vehicle ignition state. Systems and methods for using an asset tracking device added to the vehicle after the manufacture of the vehicle without a direct connection to the vehicle ignition line that can be utilized to determine ignition state information in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

Vehicle telematics devices may be utilized in a variety of stolen vehicle recovery systems. Stolen vehicle recovery systems commonly include one or more locating units (i.e. vehicle telematics devices) installed within a vehicle. These locating units are commonly hidden within the metal structure of the vehicle. Systems and methods for locating units that can be utilized in accordance with embodiments of the invention are described in U.S. Pat. No. 8,013,735, issued Sep. 6, 2011 and U.S. Pat. No. 9,088,398, issued Jul. 21, 2015. The vehicle recovery systems further include a network of communication towers, vehicle tracking units, and a network center with a database of customers who have purchased locating units. When the network center is notified that a vehicle has been stolen, the network center causes the communication towers to transmit a message; this message activates the locating unit installed in the vehicle. The activated locating unit broadcasts a signal via an amplified low-power transceiver signal that can be detected by the vehicle tracking units that can then locate the vehicle and effect its recovery. Systems and methods for synchronizing communications in a vehicle locating system that can be used in accordance with embodiments of the invention are disclosed in U.S. Pat. No. 8,630,605, issued Jan. 14, 2014. In many vehicle recovery systems, the locating units installed in vehicles that have not been stolen can, on receiving a signal that a vehicle has been stolen, repeat the signal broadcasted by the communication towers. This repeating action can be utilized to increase the coverage area of the vehicle locating system. Systems and methods for vehicle recovery systems that can be utilized in accordance with embodiments of the invention are described in U.S. Pat. No. 8,787,823, issued Jul. 22, 2014. The disclosures of U.S. Pat. Nos. 8,013,735, 8,630,605, 8,787,823, and 9,088,398 are hereby incorporated by reference in their entirety.

Amplified Transceiver Signals

Transceivers typically outputs a signal for transmission at a particular frequency or range of frequencies. In many applications, the power of the signal output by transceiver may be insufficient, necessitating amplification and/or shaping of the output signal. However, amplification of the signal may also lead to an amplification and/or introduction of unwanted emissions into the amplified signal. For example, unwanted emissions can take the form of power spikes in the signal to be transmitted. These spikes can have numerous disadvantages at amplified levels including, but not limited to, violating regulatory testing and/or excessive energy consumption. In a number of embodiments, a vehicle telematics device has a fixed battery with a pre-determined lifespan, thereby requiring power management during the transmission of signals so that the vehicle telematics device is operational for its intended lifespan. In accordance with several embodiments of the invention, proper formatting and processing of the transceiver output signal can occur, avoiding amplified power spikes and providing increased power efficiency when amplifying the signals, thereby improving the efficiency of the vehicle telematics device. Conceptual examples of transceiver signals and undesirable behaviors in transceiver signals are illustrated in FIGS. 1A-C.

Figure 1B:
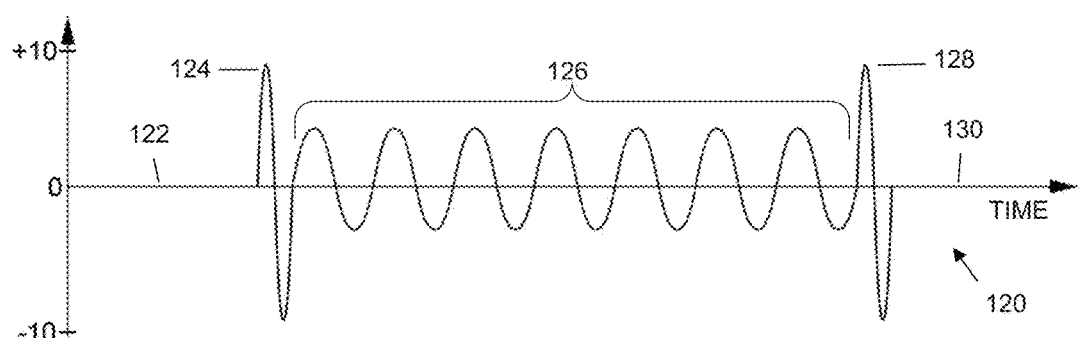
FIG. 1B is a graph conceptually illustrating the power output of an amplified low-power transceiver over time in accordance with an embodiment of the invention.
Figure 1C:
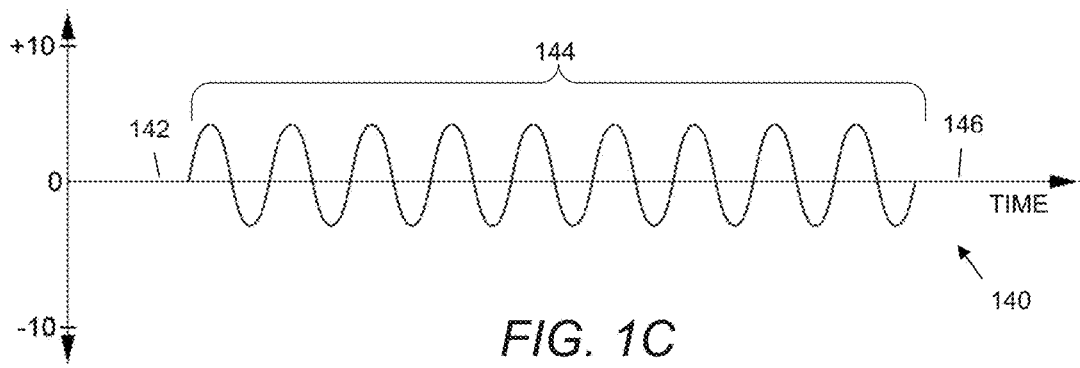
FIG. 1C is a graph conceptually illustrating the formatted and timed power output of an amplified low-power transceiver over time in accordance with an embodiment of the invention.

Turning now to FIG. 1A, a conceptual illustration of a power output vs. time graph for a transceiver transmission signal is shown. In graph 100, the initial power output 102 of the transceiver is at zero prior to the start of the signal transmission. The transceiver is powered up in order to transmit a signal at the desired operating power 106. However, when powering the transceiver signal on from a zero state 102, a pre-operational power spike 104 may occur that generates signal well above the normal operating power signal 106. When powering down the transceiver, the transceiver again generates a post-operational power spike 108 that is above the normal operating power 106. After a post-operational spike 108, the transceiver signal output may return back to a zero state 110.

When a signal from a low-power transceiver is routed into an amplifier, similar signal behaviors can occur. However, signal behaviors that were present at low power become more pronounced when amplified. Such amplified behaviors may then become undesirable if the power output exceeds a certain threshold. Turning now to FIG. 1B, a conceptual illustration of an amplified transceiver signal for transmission is shown. Similar to the lower power output shown in graph 100, graph 120 begins with an initial power output 122 of the transceiver at zero. The transceiver is powered up in order to transmit a signal at the desired operating power 126, which is greater than the operating power 106 in graph 100. When powering the transceiver signal on from a zero state 122, a pre-operational power spike 124 occurs that generates signal well above the amplified operating power signal 126. Conversely, when powering down the transceiver, the transceiver again generates a post-operational power spike 128 that is above the normal operating power 126. After the post-operational spike 128, the transceiver signal output returns back to a zero state 130.

An amplified low-power transceiver signal in accordance with embodiments of the invention may be conditioned in a manner that reduces or eliminates power spikes. A conceptual illustration of such a signal is shown in FIG. 1C. Graph 140 begins with the amplified operating signal 144 at a prior zero state 142 and begins transmission without any power spikes. Once the amplified operating signal 144 is finished transmitting, the signal return to a zero state 146.

Although specific conceptualizations of transceiver signals over time in accordance with embodiments of the invention are discussed above and illustrated in FIGS. 1A-C, a variety of time intervals, power levels, and other devices and techniques not specifically described above, can be utilized in accordance with embodiments of the invention. For example, transceiver signals may have a varying power level over time depending on the application, and power spikes may be relatively larger or smaller compared to the normal operating power. Vehicle telematics devices in accordance with many embodiments of the invention will be discussed in the following section.

Vehicle Telematics Devices

Figure 2:
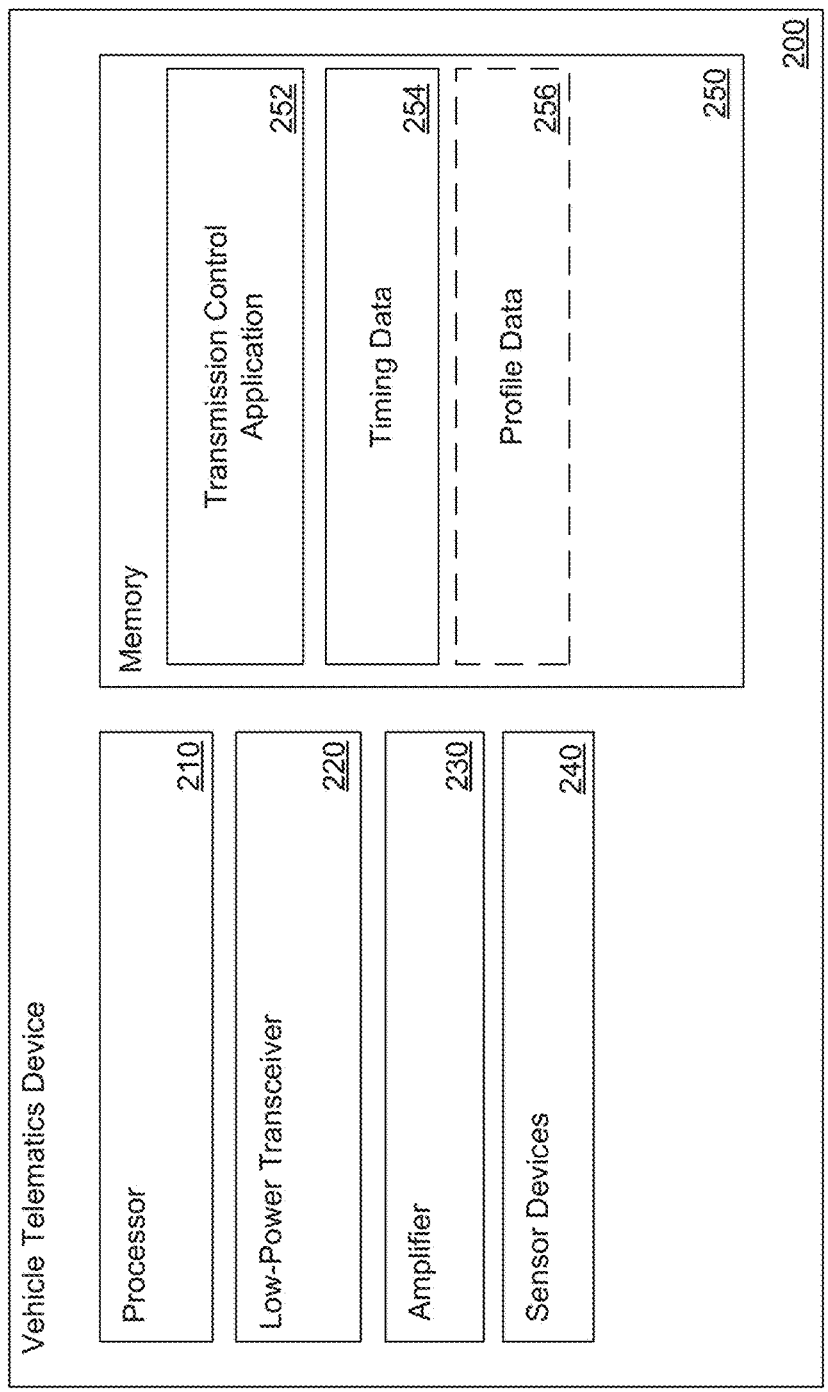
FIG. 2 is a conceptual illustration of a vehicle telematics device in accordance with an embodiment of the invention.

Vehicle telematics devices in accordance with many embodiments of the invention can transmit and receive data using a low-power transceiver. In additional embodiments, vehicle telematics devices utilize amplifiers and/or processors to shape the signal generated by the low-power transceiver. A conceptual illustration of a vehicle telematics device in accordance with an embodiment of the invention is shown in FIG. 2. The vehicle telematics device 200 includes a processor 210 in communication with a memory 250 and one or more low-power transceivers 220 capable of sending and receiving data signals. In many embodiments, low-power transceiver 220 is a CC1125 RF narrowband transceiver from Texas Instruments Incorporated of Dallas, Tex. Furthermore, low-power transceiver 220 and/or processor 210 are connected to an amplifier 230 that can amplify signals generated by low-power transceiver 220. Although the processor 210, low-power transceiver 220, and amplifier 230 are illustrated as separate components, some or all of these devices can be implemented using a single-chip solution as appropriate to the requirements of specific applications of embodiments of the invention.

The processor 210 is in communication with the low-power transceiver 220, amplifier 230, memory 250, and/or the sensor device(s) 240. The sensor devices 240 can be included within the vehicle telematics device 200 and/or located external to the vehicle telematics device 200. Sensor devices 240 can include, but are not limited to, RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. In several embodiments, the memory 250 is any form of storage storing a variety of data, including, but not limited to, a transmission control application 252, timing data 254, and/or profile data 256. In many embodiments, the transmission control application 252, timing data 254, and/or profile data 256 are stored using an external server system and received by the vehicle telematics device 200 using the low-power transceiver 220.

In several embodiments, the transmission control application 252, when read by the processor 210, directs the processor 210 to implement a variety of transmission control processes to reduce undesirable behaviors in the amplified low-power transceiver signals. A number of transmission control processes that can be performed in accordance with embodiments of the invention are described in more detail below. In many embodiments, the transmission control processes utilize one or more pieces of profile data to provide non-linear control of the behavior of the low-power transceiver 220 and/or amplifier 230. Profile data can include temperature data describing the temperature of the low-power transceiver 220 and/or amplifier 230, signal frequency data describing the frequency (range) of the signals generated by the low-power transceiver 220, power consumption data describing the power consumed by the low-power transceiver 220 and/or amplifier 230, data captured using the sensor devices 240, and any other data as appropriate to the requirements of specific applications of embodiments of the invention.

Although specific architectures for vehicle telematics devices in accordance with embodiments of the invention are conceptually illustrated in FIG. 2, any of a variety of architectures, including those that store data or applications on disk or some other form of storage and are loaded into memory at runtime, can also be utilized. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices such as, but not limited to, systems-on-a-chip (SoC).

Reducing Unwanted Emissions from Low-Power Transceivers

In many embodiments, the processing of the data for transmission includes adding a sufficient amount of buffer data at the beginning of the data stream in order to compensate for the time required to determine the bit-edge of the signal, thereby allowing for a reduction in lost data during the communication process. Transmission control processes in accordance with embodiments of the invention can include processing signal behaviors and transmitting data in accordance with the pre-processed behaviors, thereby reducing unwanted emissions. In a variety of embodiments, the transmitted signal is modulated using minimum shift keying (MSK), but any modulation techniques, such as QAM, GMSK, and CDMA, can be utilized as appropriate to the requirements of specific applications of embodiments of the invention.

Figure 3:
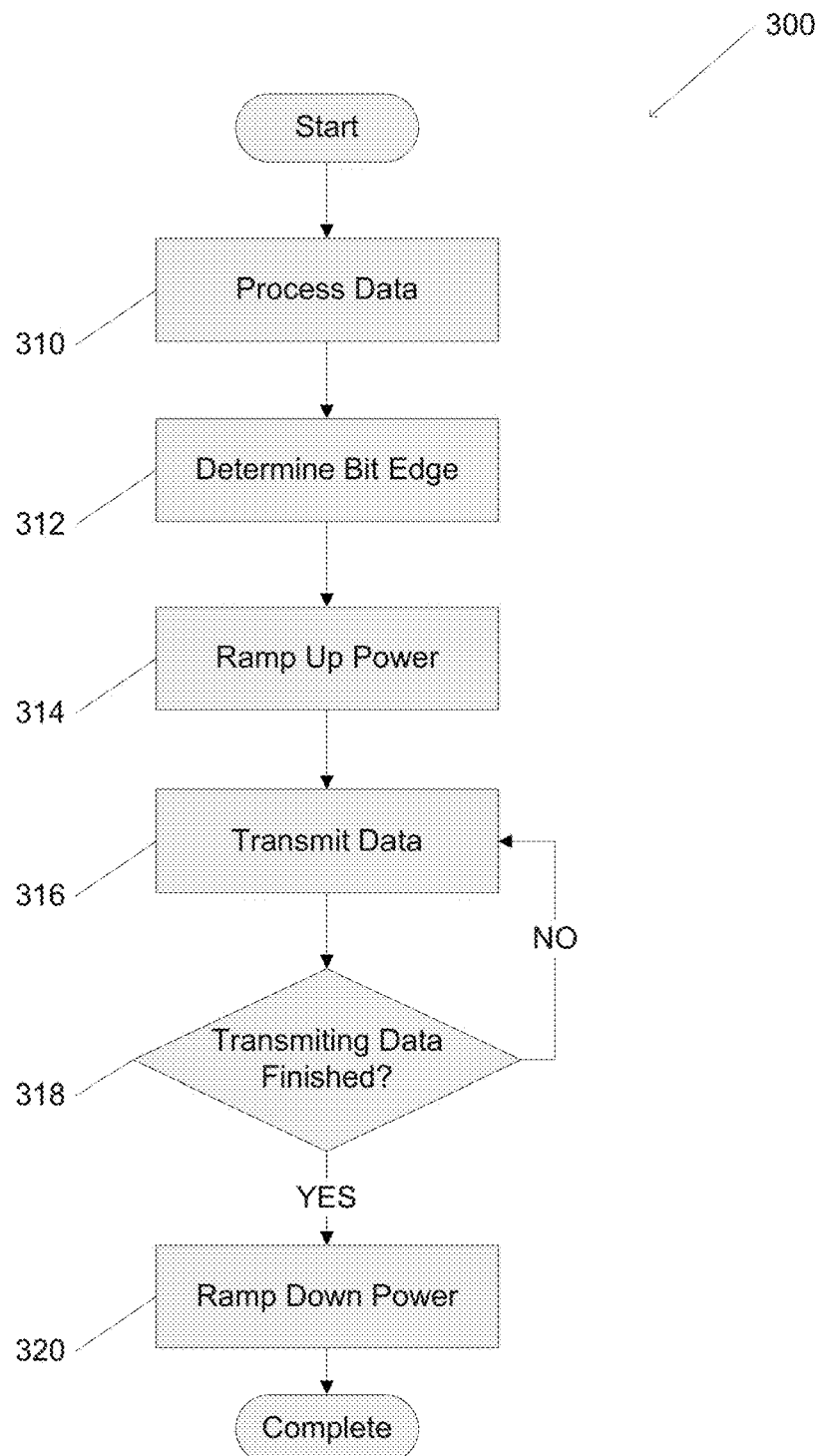
FIG. 3 is a flow chart illustrating a process for operation of a vehicle telematics device to reduce transceiver-based emissions in accordance with an embodiment of the invention.

Turning now to FIG. 3, a process for reducing transceiver-based emissions in accordance with an embodiment is shown. The process 300 includes processing (310) data for transmission. The leading bit-edge of the transceiver signal is determined (312) and power is ramped up (314). In certain embodiments, this determination can be accomplished by utilizing functions specific to a low-power transceiver. For example, a function call that produces a regular and known response that relates to the leading edge of the signal can be used. In the case of a Texas Instruments CC1125 narrow-band transceiver, the function call of TXFIFO_THR produces a transition from a high to a low signal at a fixed delay after the last bit of the first byte transmitted below the TXFIFO threshold, although any low-power transceiver function calls can be utilized as appropriate to the requirements of specific applications of embodiments of the invention. Data is transmitted (316) until it is determined that the data transmission has finished (318). When the data transmission has finished (318), the power will be ramped down (320). The ramp up and ramp down of power can be to a low-power transceiver and/or an amplifier as appropriate to the requirements of specific applications of embodiments of the invention.

Specific processes for reducing unwanted emissions from low-power transceivers in accordance with embodiments of the invention are described above and shown with respect to FIG. 3; however, any number of processes, particularly those that determine signals at different points in the signal can be utilized as appropriate to the requirements of a specific application in accordance with embodiments of the invention. More specific details regarding the types of data processing and synchronizing of data for transmission done in accordance with embodiments of the invention are described in more detail below.

Prepending Buffers and Synchronizing Data for Transmission

Transmission control processes in accordance with several embodiments of the invention can obtain and format a variety of data prior to transmitting that data. In many embodiments, the data may be obtained from sensor devices or a vehicle data bus. In many cases, failure to properly process and/or adjust the data for transmission may result in incorrect or abnormal deviations (i.e. undesirable behaviors) from an expected output. At lower power levels, these deviations may be tolerable or within normal limits for expected errors. However, as the output signal is amplified, these deviations can increase and become undesirable behaviors. In order to avoid such undesirable behaviors, the data for transmission may have a buffer applied to the signal in order to facilitate a proper synchronization to a specified transmission time. This buffer can be utilized to synchronize the behavior of a low-power transceiver with the power level of an amplifier to avoid undesirable behaviors present in the signal generated by the low-power transceiver from being amplified by the amplifier. The size and/or length buffer can be pre-determined and/or determined dynamically as appropriate to the requirements of specific applications of embodiments of the invention. In certain embodiments, the buffer is approximately 25 milliseconds and includes a constant wave before modulation of the data signal begins. The data for transmission can also be synchronized to be processed at a specific point in the signal. By way of example, the C1125 transceiver will produce fewer spurious emissions if the signal begins transmission at a leading bit-edge (zero crossover point) of the signal. In further embodiments, synchronization can be accomplished by monitoring an input/output pin of the low-power transceiver. For example, in several further embodiments, the TXFIFO_THR signal on a GPIO pin of the CC1125 low-power transceiver can be monitored for a transition from a high to a low signal that occurs a fixed amount of time after the bit edge of the last bit of the first byte is transmitted before the TXFIFO threshold. Transmission control processes in accordance with embodiments of the invention can also include prepending buffers and/or synchronizing data for transmission for reducing unwanted emissions.

Figure 4:
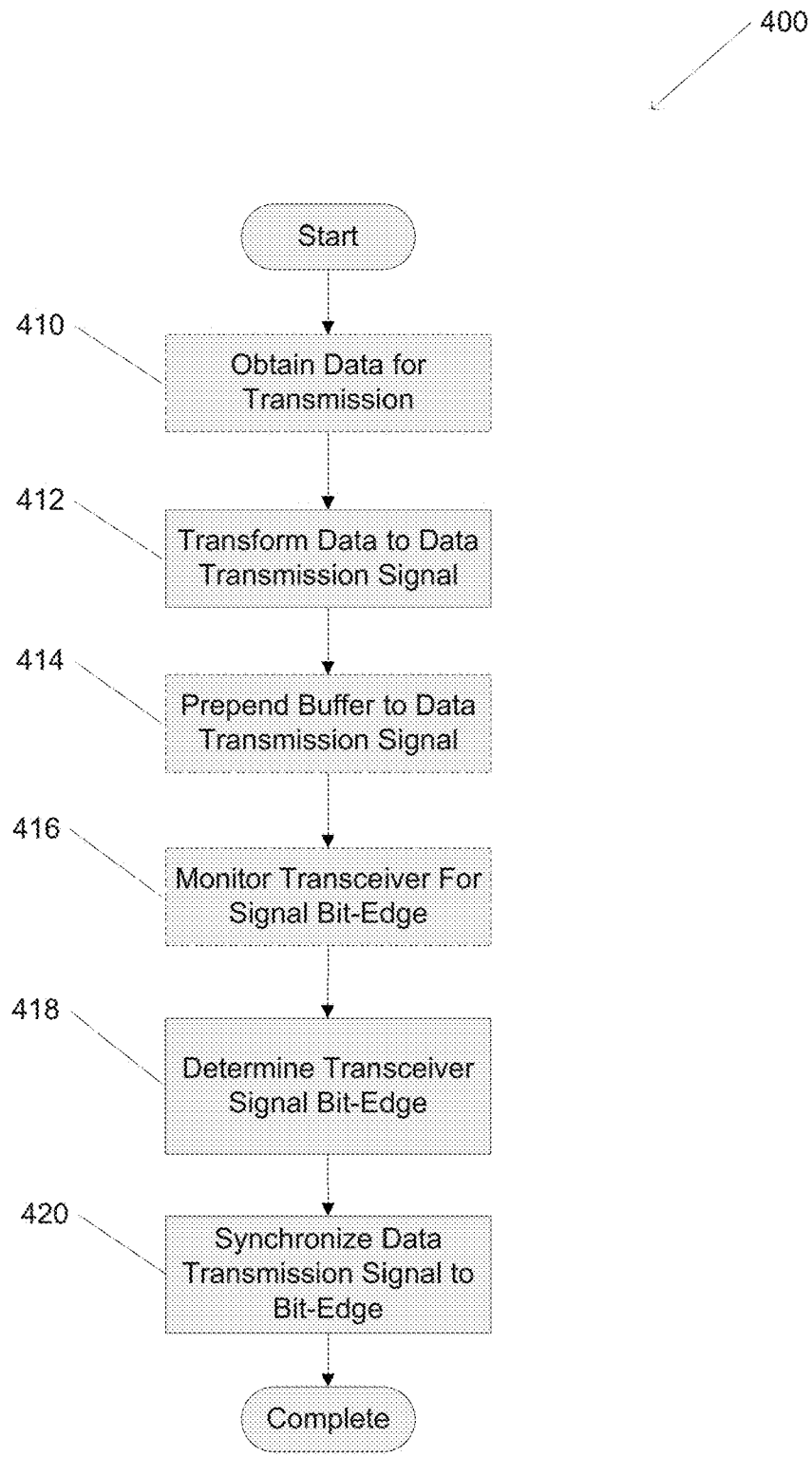
FIG. 4 is a flow chart illustrating a process for prepending buffers and synchronizing data for transmission in accordance with an embodiment of the invention.

Turning now to FIG. 4, a process for reducing transceiver-based emissions and other undesirable behavior in accordance with an embodiment is shown. The process 400 can include obtaining (410) the outgoing data for transmission. Data to be transmitted is transformed (412) into a data transmission signal. In several embodiments, the system may prepend (414) a buffer to the beginning of the data transmission signal and/or monitor (416) the transceiver for a bit-edge of the signal. The bit edge of the transceiver signal can be determined (418) and the outgoing data signal can be synchronized (420) to the bit-edge of the transceiver signal.

Specific processes for prepending buffers and synchronizing outgoing data signals in accordance with embodiments of the invention are described above and shown with respect to FIG. 4; however, any number of processes, particularly those that can prepend buffers to the signals and/or synchronize data to other points in the signal phase can be utilized as appropriate to the requirements of a specific application in accordance with embodiments of the invention. More specific details regarding sequentially powering the low-power transceiver done in accordance with embodiments of the invention are described in more detail below.

Sequentially Increasing and Decreasing Low-Power Transceiver Output Amplification In many low-power transceivers, spurious or other unwanted emissions are emitted if the amplification of the low-power transceiver output occurs either too fast or too slowly. For example, a CC1125 narrow-band transceiver requires a slower sequential increase in the amplification of the output signal power relative to the decrease in amplification to minimize spurious emissions. In order to avoid such undesirable behaviors, the amplification of the low-power transceiver output signal is increased and decreased sequentially in a manner that minimizes any unwanted emissions. Transmission control processes in accordance with embodiments of the invention can also include sequentially increasing and decreasing the amplification levels of the low-power transceiver output signal. In certain instances, the sequence of amplification increase and/or decrease is fixed based upon the characteristics of the low-power transceiver. However, certain conditions including, but not limited to, environmental conditions, transceiver properties, and/or other changes in circuit conditions may alter the optimal amplification sequence. In numerous embodiments, transceiver properties can include, but are not limited to, current power levels, output signals, input signals, and temperature. In several embodiments, the changes in the optimal amplification sequence may be factored in and used to dynamically adjust the sequential increase and/or decrease in the amplification of the low-power transceiver to compensate for these changes. In a number of embodiments, the output power of the low-power transceiver is increased from roughly 20 mW to approximately 2 W, although any levels of amplification can be utilized as appropriate to the requirements of specific applications of embodiments of the invention. In many embodiments, the sequential increase and decrease of the amplification of the low-power transceiver output signal can be achieved utilizing a non-linear PWM signal provided to the low-power transceiver as a control signal. In certain embodiments, the processor may direct a non-linear PWM signal to step through amplification level changes to minimize unwanted emissions. In further embodiments, the sequential amplification increase and/or decrease can be achieved through hardware-based methods including, but not limited to, resistor-capacitor (RC) delays. However, it should be noted that any circuit can be utilized to introduce delays as appropriate to the requirements of specific applications of embodiments of the invention.

Figure 5:
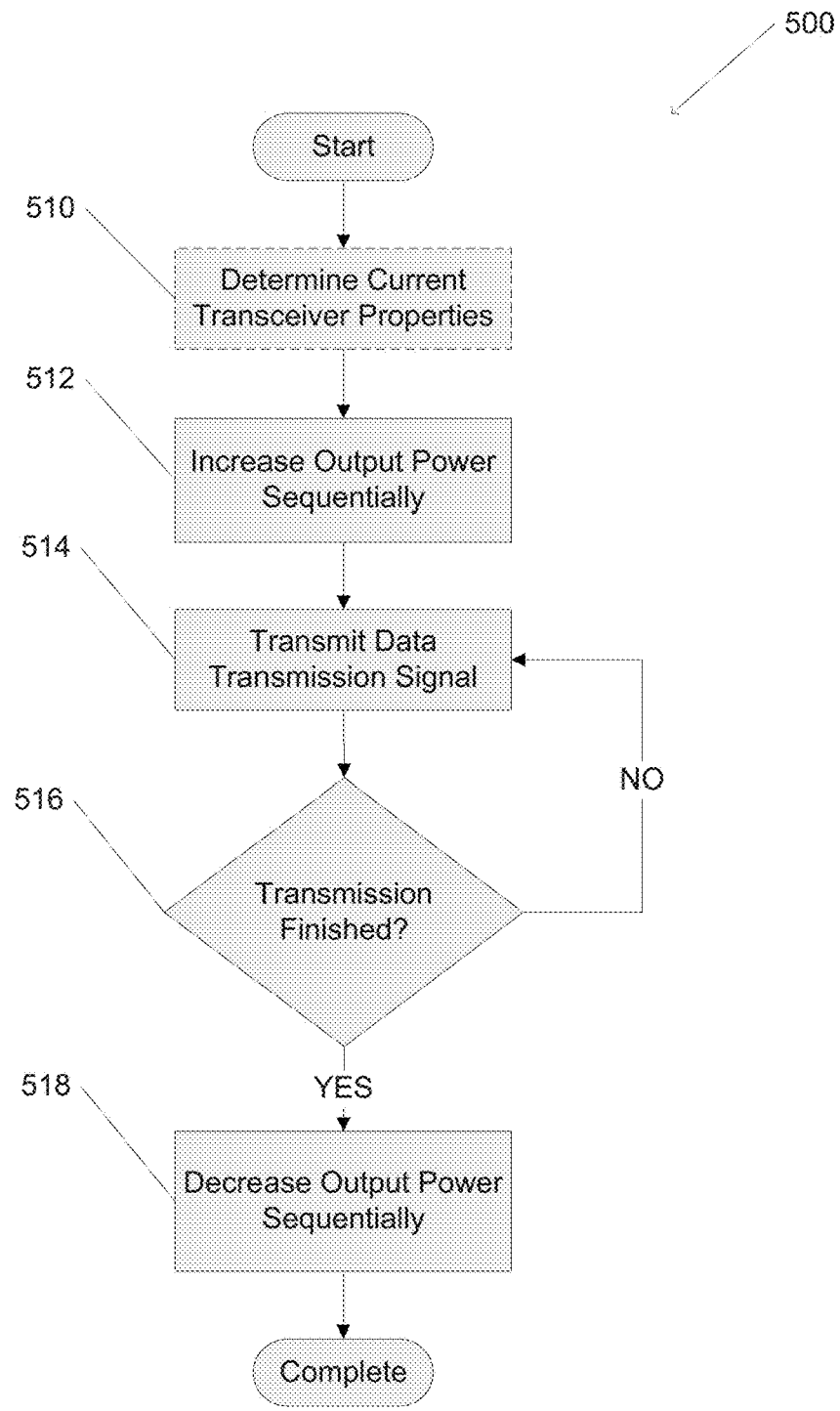
FIG. 5 is a flow chart illustrating a process for sequentially increasing and decreasing low-power transceiver output amplification in accordance with an embodiment of the invention.

Turning now to FIG. 5, a process for sequentially increasing and decreasing low-power transceiver output signals in accordance with an embodiment of the invention is shown. The process 500 can include determining (510) the current transceiver properties. The output power of the transceiver is increased (512). Transmission (514) of the data transmission signal is accomplished until the transmission is finished (516). The output power of the transceiver signal is decreased (518). The power can be increased and/or decreased sequentially and/or in a non-linear fashion as appropriate to the requirements of specific applications of embodiments of the invention. In a variety of embodiments, profile data is utilized to dynamically control the rate at which the power is modified.

Specific processes for increasing and/or decreasing the low-power transceiver output amplification in accordance with embodiments of the invention are described above and shown with respect to FIG. 5; however, any number of processes, including those that use signals other than PWM signals to control the behavior of the transceiver, can be utilized as appropriate to the requirements of a specific application of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the prepended claims and their equivalents.

What is claimed is:

1. A vehicle telematics device, comprising:
   a processor;
   a transceiver coupled to the processor to receive data to be transmitted;
   an amplifier coupled to the transceiver to receive a transceiver output signal, the amplifier coupled to the processor to receive an amplification control signal to control the amplification of the transceiver output signal by the amplifier; and
   a memory coupled to the processor, the memory storing a transmission control application;
   wherein the transmission control application directs the processor to:

format the data, including prepending a buffer signal to the data before data modulation begins, to be transmitted by the transceiver;
generate the amplification control signal;
direct the amplifier to sequentially amplify the transceiver output signal based on the amplification control signal;
transmit the formatted data; and
direct the amplifier to sequentially de-amplify the transceiver output signal based on the amplification control signal;
wherein the transmission control application further directs the processor to dynamically adjust the sequential amplification and the sequential de-amplification of the amplifier based upon monitored conditions of the transceiver.

2. The vehicle telematics device of claim 1, wherein a leading bit-edge in the transceiver output signal is determined by monitoring an input/output port of the transceiver for a transition in an output status signal related to a functional call of the data to be transmitted.

3. The vehicle telematics device of claim 2, wherein the monitoring of the input/output port of the transceiver occurs after receiving the data to be transmitted.

4. The vehicle telematics device of claim 1, wherein the transmission control application further directs the processor to monitor the conditions of the transceiver before formatting the data.

5. The vehicle telematics device of claim 1, wherein the sequential amplification of the amplifier is completed faster than the sequential de-amplification of the amplifier.

6. The vehicle telematics device of claim 1, wherein the sequential amplification and de-amplification of the amplifier are non-linear.

7. The vehicle telematics device of claim 6, wherein the sequential amplification and de-amplification of the amplifier are achieved through a non-linear pulse wave modulated (PWM) signal applied as the amplification control signal to the amplifier.

8. The vehicle telematics device of claim 1, wherein the power of the amplified transceiver output signal is approximately 2 Watts.

9. A method for transmitting data, the method comprising:
formatting data, including prepending a buffer signal to the data before data modulation begins, to be transmitted out of a vehicle telematics device using a processor and instructions stored in a memory of the vehicle telematics device;
determining a leading bit-edge of a transceiver output signal from a transceiver of the vehicle telematics device;
directing an amplifier of the vehicle telematics device to sequentially amplify the transceiver output signal using an amplifier of the vehicle telematics device;
transmitting the formatted data using the transceiver and the amplifier of the vehicle telematics device; and
directing the amplifier to sequentially de-amplify the transceiver output signal; and
adjusting the sequential amplification and de-amplification of the amplifier based on monitored conditions of the transceiver.

10. The method of claim 9, wherein the leading bit-edge in the transceiver output signal is determined by monitoring an input/output port of the transceiver for a transition in an output status signal related to a functional call of the data to be transmitted.

11. The method of claim 10, wherein the monitoring of the input/output port of the transceiver occurs after receiving the data to be transmitted.

12. The method of claim 9, further comprising monitoring the conditions of the transceiver prior to formatting data.

13. The method of claim 9, wherein the sequential amplification of the amplifier is completed faster than the sequential de-amplification of the amplifier.

14. The method of claim 9, wherein the sequential amplification and de-amplification of the transceiver are non-linear.

15. The method of claim 9, wherein the sequential amplification and de-amplification of the amplifier are achieved through a pulse wave modulated (PWM) signal applied as a control signal to the amplifier.

16. The method of claim 9, wherein the amplified transceiver output signal is approximately 2 Watts.

* * * * *